US012776463B2

(12) United States Patent
Dai et al.

(10) Patent No.: US 12,776,463 B2
(45) Date of Patent: Oct. 27, 2026

(54) MAGNETIC SHIELDING STRUCTURE FOR RELAY CONTACT AND RELAY

(71) Applicant: Xiamen Hongfa Electric Power Controls Co., Ltd., Xiamen (CN)

(72) Inventors: Wenguang Dai, Xiamen (CN); Fengzhu Xie, Xiamen (CN); Liji Su, Xiamen (CN); Songsheng Chen, Xiamen (CN); Meng Wang, Xiamen (CN)

(73) Assignee: XIAMEN HONGFA ELECTRIC POWER CONTROLS CO., LTD, Xiamen (CN)

( * ) Notice: Subject to any disclaimer, the term of this patent is extended or adjusted under 35 U.S.C. 154(b) by 159 days.

(21) Appl. No.: 18/608,102

(22) Filed: Mar. 18, 2024

(65) Prior Publication Data

US 2024/0312744 A1 Sep. 19, 2024

(51) Int. Cl.

*H01H 50/10* (2006.01)
*H01H 9/44* (2006.01)
*H01H 50/54* (2006.01)

(52) U.S. Cl.

CPC ............ *H01H 50/10* (2013.01); *H01H 50/54* (2013.01); *H01H 9/443* (2013.01)

(58) Field of Classification Search

None

See application file for complete search history.

(56) References Cited

U.S. PATENT DOCUMENTS 12,068,121 B2 * 8/2024 Yoo ...................... H01H 50/045
2015/0194284 A1 * 7/2015 Uruma ................. H01H 50/546 335/179
2016/0093458 A1 * 3/2016 An ......................... H01H 50/38 335/136

FOREIGN PATENT DOCUMENTS

| | | | |
|---|---|---|---|
| CN | 109559939 | A | 4/2019 |
| CN | 113808884 | A | 12/2021 |
| EP | 3001440 | A1 | 3/2016 |
| EP | 3879553 | A1 | 9/2021 |
| EP | 4086931 | A1 | 11/2022 |

(Continued)

OTHER PUBLICATIONS

Extended European Search Report for European Application No. 24163862.6 dated Aug. 27, 2024, 13 pages.

*Primary Examiner* — Bernard Rojas
(74) *Attorney, Agent, or Firm* — CANTOR COLBURN LLP

(57) ABSTRACT

A magnetic shielding structure for a relay contact and a relay are provided, the magnetic shielding structure includes a contact assembly, which includes a movable contact piece and a pair of stationary contact lead-out terminals, which can contact with or separate from each other; an anti-short circuit assembly, which is at least disposed at a side of the movable contact piece along a third direction, and can generate suction force when a faulty high current in the movable contact piece for resisting an electrodynamic repulsion force between the movable contact piece and the stationary contact lead-out terminals; a permanent magnet, which is disposed around the contact assembly to achieve arc extinguishing; a first magnetic shielding member, which is sleeved on the outside of a stationary contact lead-out terminal and blocks the magnetic field transmitted from the permanent magnet to the anti-short circuit assembly.

14 Claims, 6 Drawing Sheets

(56) References Cited

FOREIGN PATENT DOCUMENTS

| | | | |
|---|---|---|---|
| JP | 5809443 | B2 | 9/2015 |
| JP | 2016024864 | A | 2/2016 |
| JP | 2016072227 | A | 5/2016 |
| JP | 2022091560 | A | 6/2022 |
| JP | 2023013760 | A | 1/2023 |
| JP | 2023509055 | A | 3/2023 |
| JP | 2023552893 | A | 12/2023 |
| WO | 2022179393 | A1 | 9/2022 |

* cited by examiner

B-B

MAGNETIC SHIELDING STRUCTURE FOR RELAY CONTACT AND RELAY

CROSS REFERENCE

This application claims priority to Chinese Patent Application No. 202310264399.3, titled “Magnetic shielding structure for relay contact and relay”, filed on Mar. 17, 2023, the entire contents thereof are incorporated herein by reference.

TECHNICAL FIELD

The present disclosure generally relates to the technical field of power appliances, in particular to a magnetic shielding structure for a relay contact and a relay.

BACKGROUND

A relay is a kind of electronic control device, which is usually used in automatic control circuits. The relay includes a control system and a controlled system. The control system is also known as the input circuit, and the controlled system is also known as the output circuit. The relay is essentially an “automatic switch” that uses a small current to control a large current, so as to play the role of automatic adjustment, safety protection and circuit conversion in the circuit.

A high-voltage DC relay is a kind of relay, and most of the existing high-voltage DC relays adopt the movable contact piece direct-acting structure. With the increase of the cruising range of new energy vehicles, it is required that the heat loss of the high-voltage DC relay should be reduced under normal conditions, and because the battery capacity is higher when the battery pack is short-circuited, this requires further improvements in the anti-short circuit current capacity and the anti-short circuit current voltage capacity of the relay. When the short-circuit load is very large, the contacts of the high-voltage DC relay will bounce off due to the electrodynamic repulsion force generated by the short-circuit current, and then contact arcing will occur. Due to the high short-circuit current and voltage of the load, the contacts will suddenly ignite violently.

In order to solve this problem, the existing coil can only be made larger in size to improve the holding force of the movable iron core. However, under the framework requirements of small volume and low power consumption of users, the ampere-turn value of the coil cannot be improved, and only by increasing the contact pressure, the contact resistance of the contacts cannot be reduced and the large electrodynamic repulsion force cannot be resisted.

SUMMARY

According to a first aspect of the present disclosure, a magnetic shielding structure for a relay contact is provided, including: a contact assembly, including a movable contact piece and a pair of stationary contact lead-out terminals, the movable contact piece configured to contact with or separate from the pair of stationary contact lead-out terminals; an anti-short circuit assembly, which is at least disposed at a side of the movable contact piece facing the stationary contact lead-out terminals, and is configured to generate suction force in the event of a faulty high current in the movable contact piece for resisting an electrodynamic repulsion force between the movable contact piece and the stationary contact lead-out terminals; a permanent magnet, disposed around the contact assembly to achieve arc extinguishing by using a magnetic field formed by the permanent magnet; and a first magnetic shielding member, disposed at an outside of a stationary contact lead-out terminal for shielding a magnetic field generated by the stationary contact lead-out terminal when energized; where, the first magnetic shielding member is configured to absorb the magnetic field transmitted from the permanent magnet to the anti-short circuit assembly.

In some embodiments, the permanent magnet is disposed along a width direction of the movable contact piece.

In some embodiments, there are two permanent magnets, and the two permanent magnets are respectively disposed on both sides of the movable contact piece along a length direction of the movable contact piece and are disposed in correspondence with two first magnetic shielding members; along the length direction of the movable contact piece, the two permanent magnets, the two first magnetic shielding members and the anti-short circuit assembly are disposed in an order of one of the two permanent magnets, one of the two first magnetic shielding members, the anti-short circuit assembly, another one of the two first magnetic shielding members and another one of the two permanent magnets, and a direction of a magnetic pole of each permanent magnet is arranged along the length direction of the movable contact piece.

In some embodiments, an outer wall of the stationary contact lead-out terminal is provided with a limiting portion for limiting the first magnetic shielding member.

In some embodiments, the stationary contact lead-out terminal is provided with a fixing portion on a side toward the movable contact piece, and the fixing portion is configured to be capable of being flipped in a direction away from the movable contact piece relative to the stationary contact lead-out terminal, and to abut against the first magnetic shielding member after being flipped for fixing the first magnetic shielding member.

In some embodiments, the fixing portion is a flanging provided on the side of the stationary contact lead-out terminal facing the movable contact piece.

In some embodiments, the stationary contact lead-out terminal and the first magnetic shielding member are fixed by welding, screwing or snapping.

In some embodiments, the first magnetic shielding member is a closed ring structure annularly disposed around the stationary contact lead-out terminal; or, the first magnetic shielding member is distributed around the stationary contact lead-out terminal at intervals in a ring shape.

In some embodiments, a magnetic permeability of the first magnetic shielding member is greater than a magnetic permeability of the stationary contact lead-out terminal.

In some embodiments, a yoke clamp is provided outside the permanent magnet.

In some embodiments, the anti-short circuit assembly including: an upper magnetizer, disposed at one side of the movable contact piece near the stationary contact lead-out terminals; and a lower magnetizer, disposed at a side of the movable contact piece far away from the stationary contact lead-out terminals; where, the upper magnetizer and the lower magnetizer are configured to form a magnetic circuit therebetween.

In some embodiments, the movable contact piece is provided with a through hole, and the lower magnetizer is configured to at least partially penetrate through the through hole.

In some embodiments, there are a plurality of upper magnetizers and a plurality of lower magnetizers, and the plurality of upper magnetizers and the plurality of lower magnetizers are disposed correspondingly, and side wall portions of two adjacent lower magnetizers which are close to each other are configured to pass through the through hole.

According to the second aspect of the present disclosure, a relay is provided, which includes the magnetic shielding structure for a relay contact described in any one of the above embodiments.

In some embodiments, the relay further includes a contact container, the stationary contact lead-out terminals are provided on the contact container and are configured to at least partially extend into the contact container, and the first magnetic shielding member of the magnetic shielding structure for the relay contact is disposed inside the contact container, the permanent magnet is disposed outside the contact container.

BRIEF DESCRIPTION OF THE DRAWINGS

For a better understanding of the present disclosure, reference may be made to the embodiments shown in the following drawings. Parts in the drawings are not necessarily to scale, and the related elements may be omitted in order to emphasize and clearly explain the technical features of the present disclosure. In addition, the related elements or parts may be arranged differently as known in the art. Besides, in the drawings, the same reference numerals indicate the same or similar parts in the various drawings. The above and other features and advantages of the present disclosure will become more apparent by describing in detail exemplary embodiments thereof with reference to the accompanying drawings.

DETAILED DESCRIPTION

Figure 1:
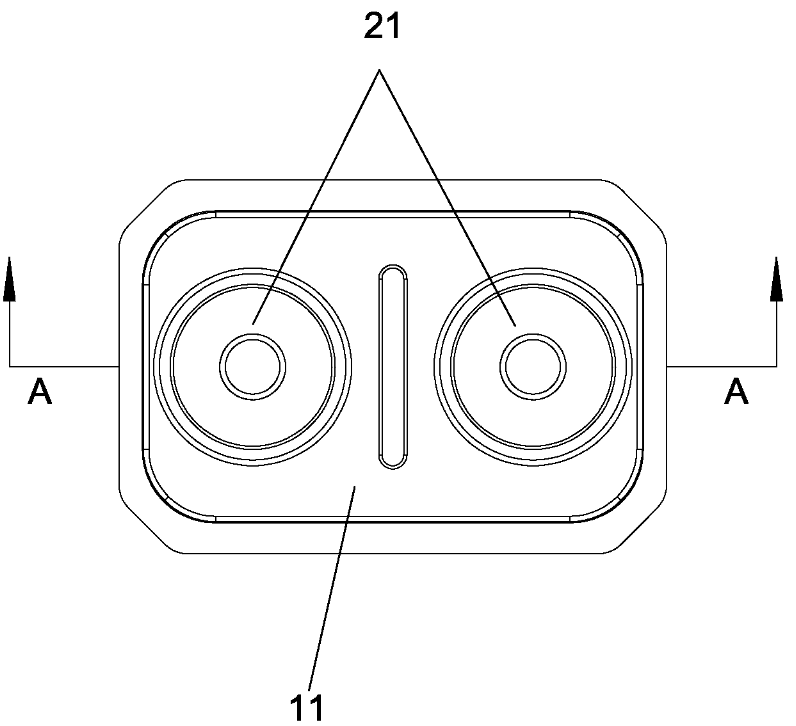
FIG. 1 is a top view of a magnetic shielding structure for a relay contact provided by the embodiments of the present disclosure.

In the following, the technical solution in the exemplary embodiments of the present disclosure will be described clearly and completely with the attached drawings. The exemplary embodiments described herein are only for illustration purposes, and are not used to limit the scope of protection of this disclosure, so it should be understood that various modifications and changes can be made to the exemplary embodiments without departing from the scope of protection of this disclosure.

In the description of the present disclosure, unless otherwise specified and limited, the terms "first" and "second" are only used for descriptive purposes and cannot be understood as indicating or implying relative importance; the term "plurality" refers to two or more; the term "and/or" includes any and all combinations of one or more associated listed items. In particular, reference to "the/described" object or "an" object is also intended to indicate one of a possible plurality of such objects.

Unless otherwise specified or stated, the terms "connect" and "fix" shall be broadly understood. For example, "connect" can be fixed connection, detachable connection, integral connection, electrical connection or signal connection; "connect" can be direct connection or indirect connection through an intermediary. For those skilled in the art, the specific meanings of the above terms in the present disclosure can be understood according to specific situations.

Further, in the description of this disclosure, it should be understood that, the locative words such as "up/top", "down/bottom", "inside/inner" and "outside/outer" described in the exemplary embodiments of the present disclosure are described from the angle shown in the attached drawings, and should not be understood as limitations to the exemplary embodiments of the present disclosure. It should also be understood that, in this context, when it is mentioned that an element or feature is connected to the "upper", "lower" or "inside" or "outside" of another element(s), it can not only be directly connected to the "upper", "lower" or "inside" or "outside" of the other element(s), but also be indirectly connected to the "upper", "lower" or "inside" or "outside" of the other element(s) through an intermediate element.

Exemplary embodiments will now be described more fully with reference to the accompanying drawings. However, the exemplary embodiments can be implemented in various forms and should not be construed as limited to the embodiments set forth herein. Rather, these embodiments are provided so that this disclosure will be thorough and complete, and will fully convey the concepts of exemplary embodiments to those skilled in the art. The same reference numerals in the drawings indicate the same or similar structures, so their detailed description will be omitted.

Figure 2:
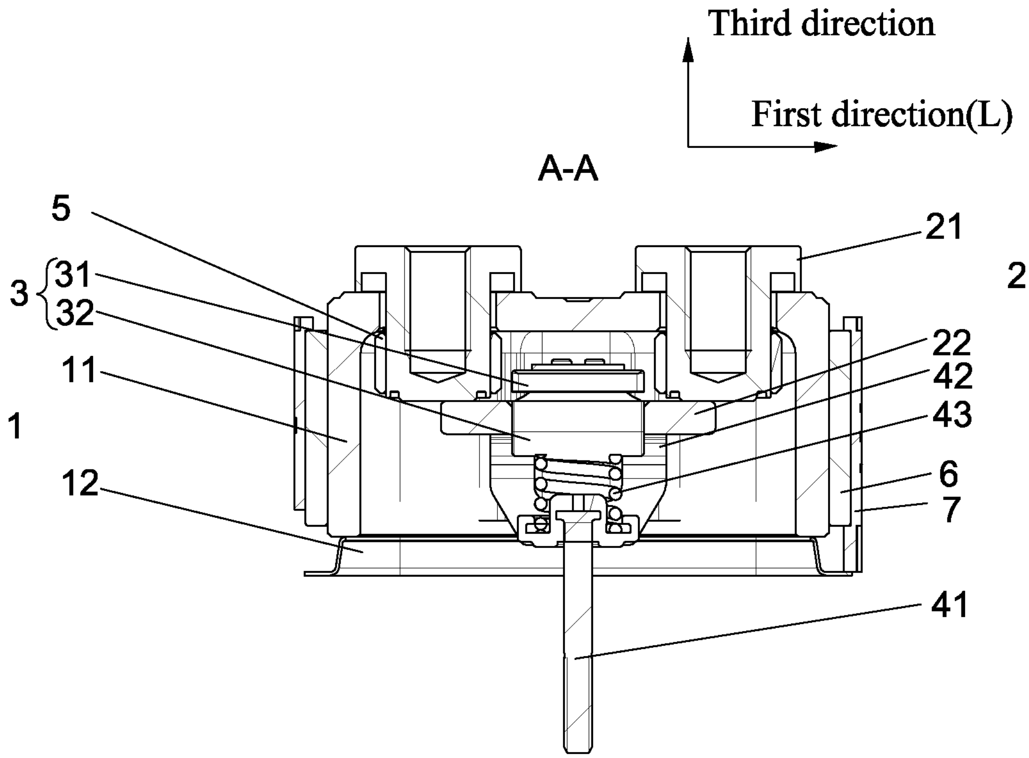
FIG. 2 is a cross-sectional view at A-A in FIG. 1.
Figure 3:
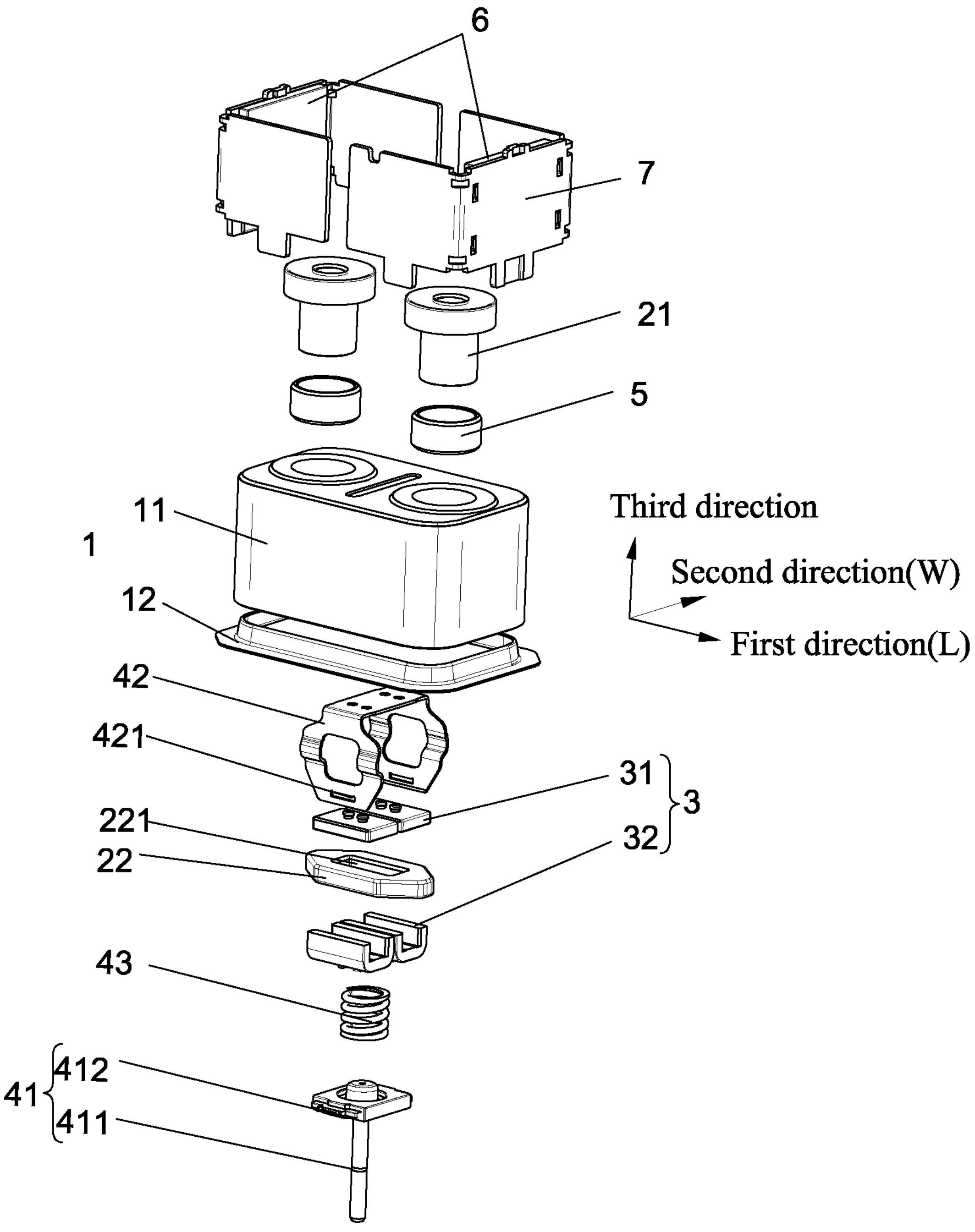
FIG. 3 is an explosion schematic diagram of the magnetic shielding structure for a relay contact provided by the embodiments of the present disclosure.

The embodiment provides a magnetic shielding structure for a relay contact which is mainly used for high-voltage DC relays. As shown in FIG. 1 to FIG. 3, the magnetic shielding structure for the relay contact includes a contact assembly 2. The contact assembly 2 includes a movable contact piece 22 and a pair of stationary contact lead-out terminals 21, and the stationary contact lead-out terminals 21 are provided on a contact container 1 of a relay and at least partially extend into the contact container 1. The movable contact piece 22 is provided in the contact container 1, and the movable contact piece 22 is used to contact with or separate from the pair of stationary contact lead-out terminals 21.

In the magnetic shielding structure for the relay contact of the embodiment of the present disclosure, the stationary contact lead-out terminals 21 are provided on the contact container 1 and at least partially extend into the contact container 1, thus, while the contact container 1 provides fixed positions for the stationary contact lead-out terminals 21, the contact container 1 also provides an insulating environment for the movable contact piece 22 and at least part of the stationary contact lead-out terminals 21 of the contact assembly 2. The movable contact piece 22 is used to contact with or separate from the pair of stationary contact lead-out terminals 21. When the movable contact piece 22 contacts with the stationary contacts at the bottom of the pair of the stationary contact lead-out terminals 21, the current flows in from one stationary contact lead-out terminal 21, and flows out from the other stationary contact lead-out terminal 21 after passing through the movable contact piece 22, thus realizing the connection of the load.

Where, defining the direction in which the pair of stationary contact lead-out terminals 21 are lined up, the length direction L of the movable contact piece 22 as a first direction, and the direction in which the stationary contact lead-out terminals 21 and the movable contact piece 22 are contacted and separated as a third direction. The second direction is a direction perpendicular to the first direction and the third direction, i.e., the second direction is the width direction W of the movable contact piece 22. The first direction, the second direction and the third direction are perpendicular to each other, and the first, second and third directions only represent spatial directions and have no substantive meaning.

Figure 8:
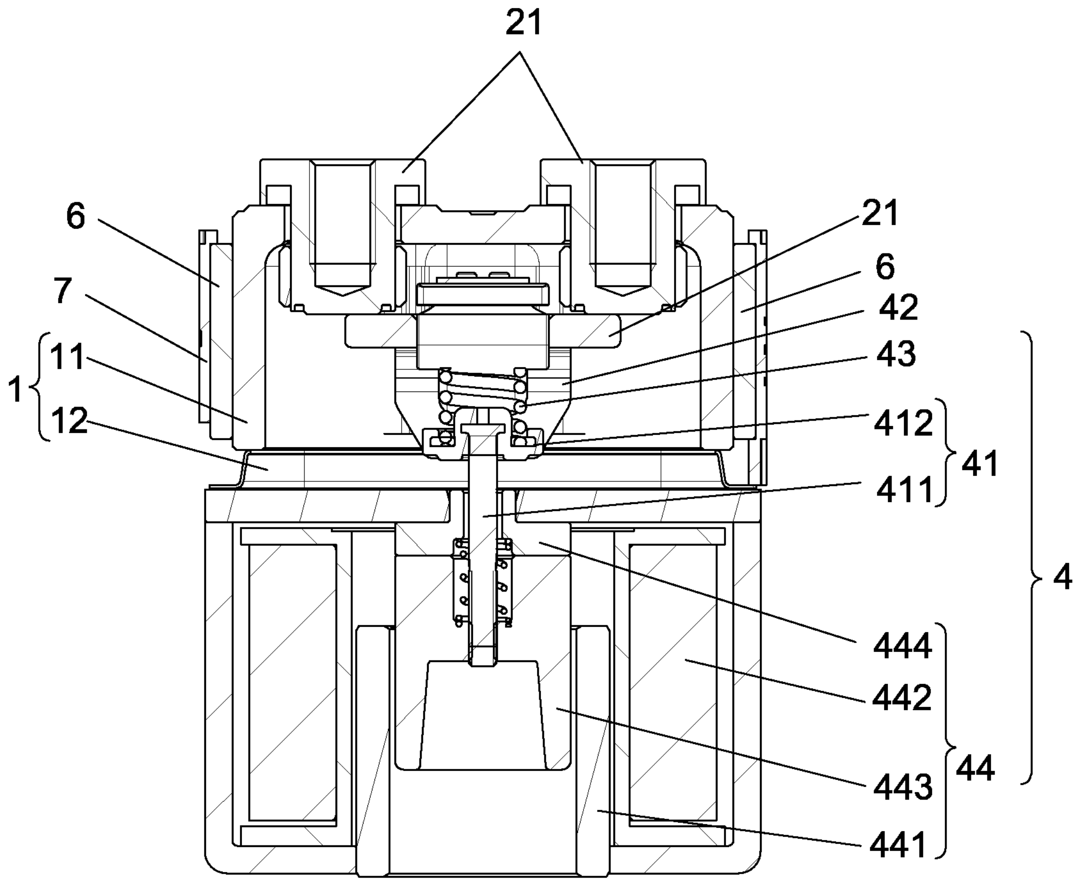
FIG. 8 is a cross-sectional view at B-B in FIG. 7.

In one embodiment, as shown in FIG. 2 to FIG. 3, the contact container 1 includes an insulating cover 11 and a frame piece 12, the insulating cover 11 and the yoke plate 13 (as shown in FIG. 8) enclose a contact chamber, and the insulating cover 11 is connected with the yoke plate 13 through the frame piece 12, the contact chamber provides an insulating environment for the contact between the movable contact piece 22 and the stationary contact lead-out terminals 21.

When the short-circuit load is large, under the action of the short-circuit current, there will be an electrodynamic repulsion force between the movable contact piece 22 and the stationary contact lead-out terminal 21, which will cause the contacts to bounce off, resulting in generating an arc when the contacts are separated and burning violently, and even an explosion may occur.

As shown in FIG. 2 to FIG. 3, the magnetic shielding structure for the relay contact further includes a first magnetic shielding member 5 which is provided at the outside of the stationary contact lead-out terminal 21 for shielding the magnetic field generated by the stationary contact lead-out terminal 21 when energized.

The first magnetic shielding member 5 is provided at the outside of the stationary contact lead-out terminal 21, and the first magnetic shielding member 5 is capable of shielding the magnetic field generated when the stationary contact lead-out terminal 21 is energized to reduce the ampere force acting on the movable contact piece 22, thereby reducing the electrodynamic repulsion force between the stationary contact lead-out terminals 21 and the movable contact piece 22, effectively avoiding the risk of explosion caused by electric arc when the movable contact piece 22 bounces off, and improving the safety performance of the relay, so that the relay is able to be suitable for use in the working environment where the short-circuit current passing through the load is large, and the service life is prolonged. At the same time, the first magnetic shielding member 5 is easily magnetized under the short-circuit current, and is able to generate an upward suction force to the movable contact piece 22, which facilitates the movable contact piece 22 to move in the direction close to the stationary contact lead-out terminals 21 to maintain a reliable contact between the stationary contact lead-out terminals 21 and the movable contact piece 22, and thus achieving the effect of resisting the short-circuit current.

As shown in FIG. 2 to FIG. 3, the magnetic shielding structure for the relay contact provided by the embodiment further includes an anti-short circuit assembly 3 which is at least disposed at the side of the movable contact piece 22 facing the stationary contact lead-out terminal 21, in the embodiment, the anti-short circuit assembly 3 is at least disposed at the upper side of the movable contact piece 22 along the axial direction (the third direction) of the stationary contact lead-out terminals 21, and generates suction force in the event of a faulty high current in the movable contact piece 22. The anti-short circuit assembly 3 is used for resisting the electrodynamic repulsion force between the movable contact piece 22 and the stationary contact lead-out terminals 21.

The anti-short circuit assembly 3 is at least disposed on the upper side of the movable contact piece 22 along the axial direction of the stationary contact lead-out terminals 21, for example, the anti-short circuit assembly 3 is disposed on both sides of the movable contact piece 22 along the third direction, so as to sandwich the movable contact piece 22 inside the anti-short circuit assembly 3, which is equivalent to adding a short circuit ring structure at the movable contact piece 22, and can magnetically shield part of the magnetic field generated by the movable contact piece 22 to a certain extent. When the movable contact piece 22 has a fault high current, the anti-short circuit assembly 3 can form a magnetic conductive loop and generate a suction force, which plays a role in attracting and pulling the movable contact piece 22, reduces the repulsion of the magnetic field between the stationary contact lead-out terminals 21 and the movable contact piece 22, and is used to resist the electrodynamic repulsion force between the movable contact piece 22 and the stationary contact lead-out terminals 21 due to the fault current, avoid the situation that the movable contact piece 22 and the stationary contact lead-out terminals 21 are separated from each other and lead to an arc-puling explosion, so as to guarantee the reliability and safety of the contact between the movable contact piece 22 and the stationary contact lead-out terminals 21.

As shown in FIG. 2 to FIG. 3, the magnetic shielding structure for the relay contact provided by the embodiment further includes a permanent magnet 6, which is disposed around the contact assembly 2 to achieve arc extinguishing by using the magnetic field formed by the permanent magnet 6.

The first magnetic shielding member 5 can absorb the magnetic field from the permanent magnet 6 to the anti-short circuit assembly 3, that is, the magnetic field generated by the permanent magnet 6 will be absorbed by the first magnetic shielding member 5 first, which reduces the influence of the permanent magnet 6 on the anti-short circuit assembly 3, and thus improves the anti-short circuit effectiveness. In addition, the first magnetic shielding member 5 itself can not only be magnetized, but also absorb the magnetic field of the permanent magnet 6, so the suction force of the first magnetic shielding member 5 to the movable contact piece 22 will also increase when there is a short circuit current, thus further increasing the anti-short circuit effect.

In one embodiment, as shown in FIG. 2 to FIG. 3, the permanent magnet 6 is disposed along the width direction W (the second direction) of the movable contact piece 22.

The permanent magnet 6 is disposed along the width direction W of the movable contact piece 22, so that the permanent magnet 6, the first magnetic shielding member 5 and the anti-short circuit assembly 3 are disposed at intervals along the first direction, and the first magnetic shielding member 5 is disposed between the permanent magnet 6 and the anti-short circuit assembly 3, so that the magnetic field generated by the permanent magnet 6 will be preferentially absorbed by the first magnetic shielding member 5, which plays an effective isolation role to reduce the influence of the permanent magnet 6 on the anti-short circuit assembly 3, thereby improving the anti-short circuit effect. Since the first magnetic shielding member 5 itself will be magnetized and it will absorb the magnetic field generated by the permanent magnet 6, when a large short-circuit current occurs, the suction force to the movable contact piece 22 can be increased, and the anti-short circuit effect can be further increased.

In one embodiment, as shown in FIG. 2 to FIG. 3, there are two permanent magnets 6, and the two permanent magnets 6 are respectively disposed at both sides of the movable contact piece 22 along the length direction L of the movable contact piece 22 and are disposed in correspondence with the two first magnetic shielding members 5. The permanent magnets 6, the first magnetic shielding members 5 and the anti-short circuit assembly 3 are disposed along the length direction L of the movable contact piece 22, and are disposed in the order of one of the two permanent magnets 6, one of the two first magnetic shielding members 5, the anti-short circuit assembly 3, the other of the two first magnetic shielding members 5 and the other of the two permanent magnets 6.

In this way, the two permanent magnets 6 are respectively disposed at both sides of the movable contact piece 22 along the first direction, that is, the two permanent magnets 6 are disposed at the left and right sides instead of front and back sides, so that the pair of stationary contact lead-out terminals 21 are closer to the permanent magnets 6 disposed at left and right sides. The two permanent magnets 6 and the two first magnetic shielding members 5 are disposed correspondingly, thus, one of the permanent magnets 6, one of the first magnetic shielding members 5, the anti-short circuit assembly 3, the other one of the first magnetic shielding members 5 and the other one of the permanent magnets 6 are disposed approximately in a straight line, so that the magnetic field of each permanent magnet 6 can be absorbed by one first magnetic shielding member 5 to reduce the influence of the anti-short circuit assembly 3.

In one embodiment, the magnetic pole direction of each permanent magnet 6 is arranged along the length direction L of the movable contact piece 22. That is, the N pole and S pole of each permanent magnet 6 are distributed along the length direction L of the movable contact piece 22, so that the arc extinguishing space is larger.

In one embodiment, the permanent magnet 6 can also be referred to as an arc extinguishing magnet.

The two permanent magnets 6 are provided opposite each other and the N and S poles are opposite, and the mutually facing surfaces of the two permanent magnets 6 have opposite polarities. That is, the left side of the permanent magnet 6 located on the left side of the insulating cover 11 is S pole and the right side is N pole, and the left side of the permanent magnet 6 located on the right side of the insulating cover 11 is S pole and the right side is N pole. Of course, the polarities of the mutually facing surfaces of the two permanent magnets 6 can also be designed to be the same, for example, the left side of the permanent magnet 6 located on the left side of the insulating cover 11 is S pole and the right side is N pole, and the left side of the permanent magnet 6 located on the right side of the insulating cover 11 is N pole and the right side is S pole.

In this way, a magnetic field can be formed around the contact assembly 2 by providing the two permanent magnets 6 that are opposed to each other. According to the principle that charged particles are deflected by Lorentz force in the magnetic field, the magnetic field can lengthen and extinguish the arc, thus achieving the effect of magnetic blowing to extinguish the arc. In addition, under the action of the magnetic fields of the two permanent magnets 6, the arcs generated by the separation of the two stationary contact lead-out terminals 21 and the movable contact piece 22 will be quickly pulled apart in the corresponding directions, specifically, when the two permanent magnets 6 face each other with the same polarity, the arcs generated by the separation of the two stationary contact lead-out terminals 21 and the movable contact piece 22 will blow to the same side; when the two permanent magnets 6 face each other with different polarities, the arcs generated by the separation of the two stationary contact lead-out terminals 21 and the movable contact piece 22 will blow to different sides.

In one embodiment, a yoke clamp 7 is provided outside the permanent magnet 6, and the yoke clamp 7 plays the role of magnetic conduction.

In some embodiments, the yoke clamp 7 is made of soft magnetic material, and the soft magnetic materials can include but are not limited to iron, cobalt, nickel and their alloys. Two yoke clamps 7 are disposed corresponding to the positions of the two permanent magnets 6, and the two yoke clamps 7 surround the insulating cover 11 and the two permanent magnets 6. Since the yoke clamps 7 surround the permanent magnets 6, the magnetic fields generated by the permanent magnets 6 can be prevented from spreading outward and affecting the arc extinguishing effect.

In one embodiment, the magnetic permeability of the first magnetic shielding member 5 is greater than that of the stationary contact lead-out terminal 21. The stationary contact lead-out terminal 21 is made of metal such as copper or copper alloy, and the first magnetic shielding member 5 is made of magnetic conductive material such as electrical pure iron. The stationary contact lead-out terminal 21 generates an induced magnetic field when it is energized, when the magnetic induction lines enter the first magnetic shielding member 5 from the air, the magnetic induction lines deviate greatly and converge strongly, thus producing a good magnetic shielding effect.

It can be understood that the first magnetic shielding member 5 is sleeved on the stationary contact lead-out terminal 21, and the shape of the first magnetic shielding member 5 includes but is not limited to a cylindrical shape, an elliptical cylinder shape, a square cylinder shape, a polygonal cylinder shape and the like.

In one embodiment, the first magnetic shielding member 5 is a closed ring structure annularly disposed around the stationary contact lead-out terminal 21; alternatively, the first magnetic shielding member 5 is distributed around the stationary contact lead-out terminal 21 at intervals in a ring shape.

In some embodiments, the first magnetic shielding member 5 can be of integrated construction, for example, the first magnetic shielding member 5 is sleeved outside the stationary contact lead-out terminal 21 in an integral cylindrical shape or in an integral annular shape, and the first magnetic shielding member 5 adopts an integral molding structure, so that the assembly process of parts is reduced, and the production cost is relatively low.

In some embodiments, the first magnetic shielding member 5 can also be of a separated construction, the first magnetic shielding member 5 includes a plurality of magnetic shielding monomers, and the plurality of magnetic shielding monomers are disposed in a circumferential direction along the stationary contact lead-out terminal 21 and are capable of being connected to each other head-to-tail to form a structure such as a cylinder, a polygonal cylinder, and the like. In some other embodiments, the plurality of magnetic shielding monomers can also be distributed around the outside of the stationary contact lead-out terminal 21 at annular intervals, or a single magnetic shielding monomer can be provided at the outside of the stationary contact lead-out terminal 21, as long as the magnetic shielding effect can be achieved, the present embodiments are not limited herein.

Figure 4:
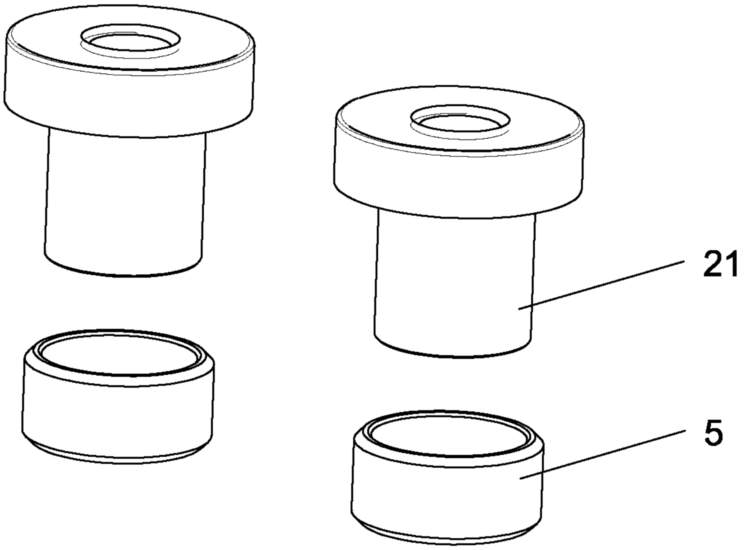
FIG. 4 is an explosion schematic diagram of the stationary contact lead-out terminals and the first magnetic shielding member of the magnetic shielding structure for a relay contact provided by the embodiments of the present disclosure.
Figure 5:
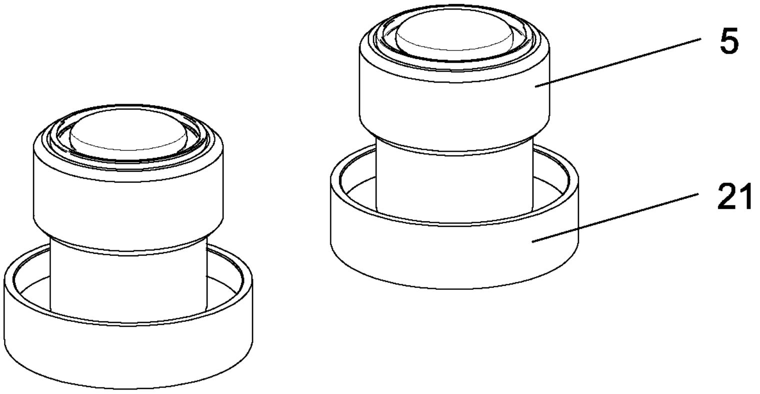
FIG. 5 is a schematic structural diagram of the stationary contact lead-out terminals and the first magnetic shielding member of the magnetic shielding structure for a relay contact provided by the embodiments of the present disclosure.

In one embodiment, as shown in FIG. 4 to FIG. 5, the outer wall of the stationary contact lead-out terminal 21 is provided with a limiting portion 211 for limiting the first magnetic shielding member 5.

Figure 9:
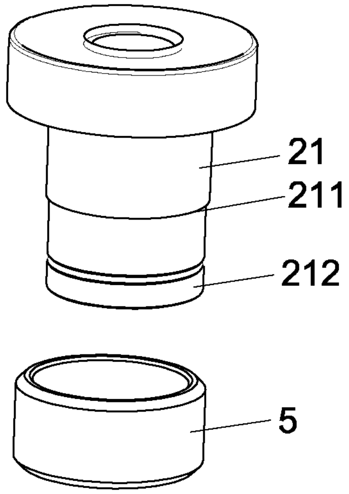
FIG. 9 is an explosion schematic diagram of the stationary contact lead-out terminals and the first magnetic shielding member of the magnetic shielding structure for a relay contact provided by the embodiments of the present disclosure.

As shown in FIG. 9, the outer wall of the stationary contact lead-out terminal 21 is provided with a limiting portion 211, so that the limiting portion 211 can initially position the first magnetic shielding member 5 when the first magnetic shielding member 5 is installed at the stationary contact lead-out terminal 21, thus improving the installation accuracy of the first magnetic shielding member 5. At the same time, the limiting portion 211 can limit the first magnetic shielding member 5 to prevent the first magnetic shielding member 5 from falling.

Where, the limiting portion 211 can be a stop step or an annular positioning groove or a positioning projection provided on the stationary contact lead-out terminal 21, etc., as long as it is possible to realize the positioning of the first magnetic shielding member 5 relative to the stationary contact lead-out terminal 21, all of which are within the scope of protection of the present embodiment. Of course, in some other embodiments, the limiting portion 211 can also be provided on the inner wall of the top of the contact container 1, and since the stationary contact lead-out terminal 21 partially extends into the contact container 1, the limiting portion 211 disposed on the inner wall of the top of the contact container 1 can also realize the limiting of the first magnetic shield member 5.

In one embodiment, as shown in FIG. 9, the stationary contact lead-out terminal 21 is provided with a fixing portion 212 on the side toward the movable contact piece 22, and the fixing portion 212 is configured to be capable of being flipped in a direction away from the movable contact piece 22 relative to the stationary contact lead-out terminal 21, and to abut against the first magnetic shielding member 5 after being flipped for fixing the first magnetic shielding member 5.

The stationary contact lead-out terminal 21 is provided with a fixing portion 212 on the side facing the movable contact piece 22, which is equivalent to the fixing portion 212 at the bottom of the stationary contact lead-out terminal 21. If the fixing portion 212 is fixedly disposed relative to the stationary contact lead-out terminal 21, then the fixing portion 212 with a larger size may restrict the first magnetic shielding member 5 from being mounted to the stationary contact lead-out terminal 21, or the fixing portion 212 with a smaller size may have an unstable fixing effect although it does not restrict the mounting of the first magnetic shielding member 5 to the stationary contact lead-out terminal 21.

Therefore, the fixing portion 212 provided by the embodiment is movably disposed relative to the stationary contact lead-out terminal 21, before the first magnetic shielding member 5 is installed, the fixing portion 212 is configured to extend along the axial direction of the stationary contact lead-out terminal 21 or the angle between the extension direction of the fixing portion 212 and the axial direction of the stationary contact lead-out terminal 21 is relatively small, so that it is convenient for the first magnetic shielding member 5 to pass through the fixing portion 212 and to be installed on the outside of the stationary contact lead-out terminal 21. After the first magnetic shielding member 5 is sleeved on the stationary contact lead-out terminal 21, the fixing portion 212 can be flipped in a direction away from the movable contact piece 22 by flaring riveting to fold the fixed portion upwardly, and after the fixing portion 212 is in contact with the first magnetic shielding member 5, the fixing portion 212 is pressed against the first magnetic shielding member 5, thereby realizing the fixing of the first magnetic shielding member 5. By adopting this riveting method, the fixing portion 212, while not restricting the first magnetic shielding member 5 from being mounted on the stationary contact lead-out terminal 21, also ensures a fixing effect between the first magnetic shielding member 5 and the stationary contact lead-out terminal 21, making the connection more convenient and reliable.

In one embodiment, the fixing portion 212 is a flanging provided on the side of the stationary contact lead-out terminal 21 facing the movable contact piece 22. The flanging can also be called a side edge, a corrugated edge, etc., and the first magnetic shielding member 5 can be fixed at the stationary contact lead-out terminal 21 by using a flanging that can be folded, which is simple in structure, convenient, and the relatively low in production cost.

In one embodiment, the stationary contact lead-out terminal 21 and the first magnetic shielding member 5 are fixed by welding, screwing or snapping.

In some embodiments, the outer wall of the stationary contact lead-out terminal 21 can be provided with external threads, and the inner wall of the first magnetic shielding member 5 is provided with internal threads, i.e., the first magnetic shielding member 5 is configured to be a nut structure, and the external threads are threadedly coupled to the internal threads to realize a detachable connection between the stationary contact lead-out terminal 21 and the first magnetic shielding member 5.

In some embodiments, one of the outer wall of the stationary contact lead-out terminal 21 and the inner wall of the first magnetic shielding member 5 is provided with a protrusion and the other is provided with a slot, and the protrusion is snapped into the slot to realize the snap-fixing between the stationary contact lead-out terminal 21 and the first magnetic shielding member 5.

In some embodiments, the stationary contact lead-out terminal 21 and the first magnetic shielding member 5 can also be fixed directly by a welding, such as brazing, or the like, which is a simple process and has a relatively low production cost.

In one embodiment, as shown in FIG. 2 to FIG. 3, the anti-short circuit assembly 3 includes an upper magnetizer 31 and a lower magnetizer 32, and the upper magnetizer 31 is disposed at one side of the movable contact piece 22 near the stationary contact lead-out terminals 21, and the lower magnetizer 32 is disposed at the side of the movable contact piece 22 far away from the stationary contact lead-out terminals 21. A magnetic circuit is formed between the upper magnetizer 31 and the lower magnetizer 32 to generate a suction force for resisting the electrodynamic repulsion force between the movable contact piece 22 and the stationary contact lead-out terminals 21 in the event of a faulty high current occurred in the movable contact piece 22. Where, the upper magnetizer 31 and the lower magnetizer 32 can be made of materials such as iron, cobalt, nickel and their alloys.

The lower magnetizer 32 is fixed below the movable contact piece 22, and the lower magnetizer 32 can be moved together with the movable contact piece 22 in a direction close to the stationary contact lead-out terminals 21, so that a magnetic circuit can be formed between the upper magnetizer 31 and the lower magnetizer 32. In the event of a faulty high current occurred in the movable contact piece 22, since the upper magnetizer 31 is located above the movable contact piece 22 and the lower magnetizer 32 is located below the movable contact piece 22, it is equivalent to the movable contact piece 22 being sandwiched between the upper magnetizer 31 and the lower magnetizer 32. When the upper magnetizer 31 generates a suction force to the lower magnetizer 32, the suction force plays the role of attracting and pulling the movable contact piece 22, and is used to resist the electrodynamic repulsion force between the movable contact piece 22 and the stationary contact lead-out terminals 21 due to the fault current, avoiding a situation in which the movable contact piece 22 and the stationary contact lead-out terminals 21 are separated from each other and lead to an arc-drawing explosion, and assuring the reliability and safety of the contact between the movable contact piece 22 and the stationary contact lead-out terminals 21.

In some other embodiments, the upper magnetizer 31 can have a linear structure, and the upper magnetizer 31 is correspondingly disposed between the two movable contacts of the movable contact piece 22, and the upper magnetizer 31 can extend along the width direction T of the movable contact piece 22 for matching and correspondence between the upper magnetizer 31 and the lower magnetizer 32. The lower magnetizer 32 has a U-shaped structure, and the opening of the lower magnetizer 32 faces the movable contact piece 22, so that the two side arms of the lower magnetizer 32 extend in the direction close to the upper magnet 31, so that the two side arms of the lower magnetizer 32 are able to approach or contact with both ends of the upper magnetizer 31 respectively, so as to form a surrounding magnetic conduction ring on the movable contact piece 22 along its width direction T. Since the two ends of the movable contact piece 22 along its length direction L are configured to be the movable contacts, there will be no interference in the surrounding magnetic conduction ring formed along the width direction T of the movable contact piece 22, and when the movable contact piece 22 has a fault high current, electromagnetic attraction in the pressure direction of the movable contacts will be generated to resist the electrodynamic repulsion force between the movable contact piece 22 and the stationary contact lead-out terminals 21 due to the fault current.

In one embodiment, as shown in FIG. 2 to FIG. 3, the movable contact piece 22 is provided with a through hole 221, and the lower magnetizer 32 at least partially penetrates through the through hole 221.

In this way, the movable contact piece 22 provides a mounting and fixing position for the lower magnetizer 32, so as to improve the fixing effect between the movable contact piece 22 and the lower magnetizer 32. Since the lower magnetizer 32 is similar to a U-shaped structure, the opening of the lower magnetizer 32 is configured to face the movable contact piece 22, and one side arm of the lower magnetizer 32 is wrapped around the long side of the movable contact piece 22, and the other side arm penetrates through the through hole 221.

In one embodiment, there are a plurality of upper magnetizers 31 and a plurality of lower magnetizers 32, and the plurality of upper magnetizers 31 and the plurality of lower magnetizers 32 are disposed correspondingly, and the side wall portions of two adjacent lower magnetizers 32 which are close to each other are configured to pass through the through hole 221.

The plurality of upper magnetizers 31 and the plurality of lower magnetizers 32 are provided in correspondence to increase the magnetic attraction effect between the upper magnetizer 31 and the lower magnetizer 32, and further improve the effect of attracting and pulling the movable contact piece 22 to resist the electrodynamic repulsion force between the movable contact piece 22 and the stationary contact lead-out terminals 21 due to the fault current.

For example, the number of the upper magnetizer 31 and the lower magnetizer 32 are two respectively, and the side walls of the two lower magnetizers 32 which are close to each other are configured to pass through the through hole 221 together, so that the installation of the two lower magnetizers 32 is realized by using the one through hole 221, thus reducing the production cost and the assembly difficulty.

Figure 6:
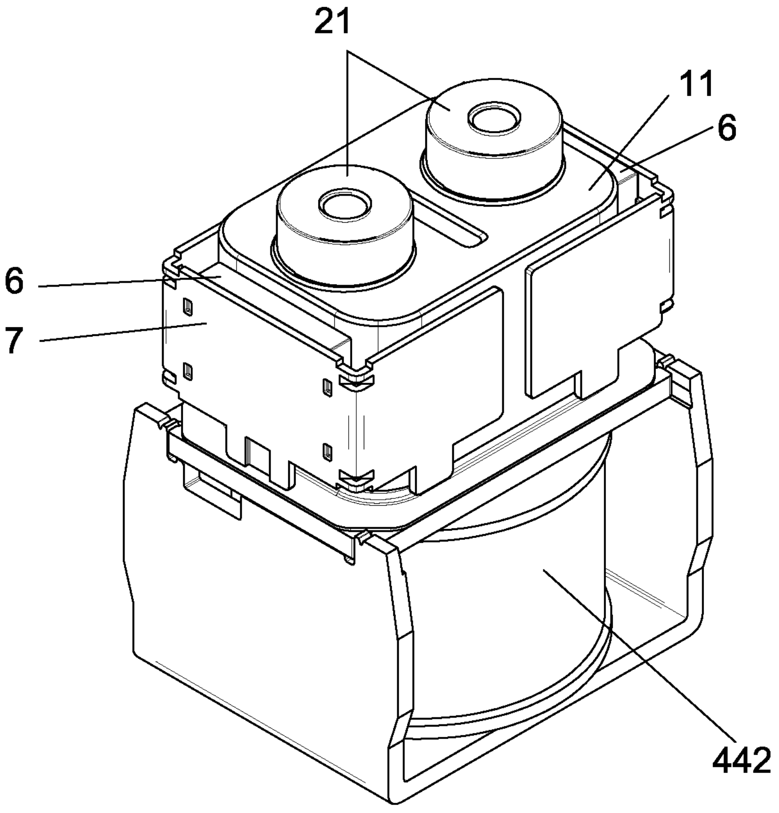
FIG. 6 is a schematic structural diagram of the relay provided by the embodiments of the present disclosure.
Figure 7:
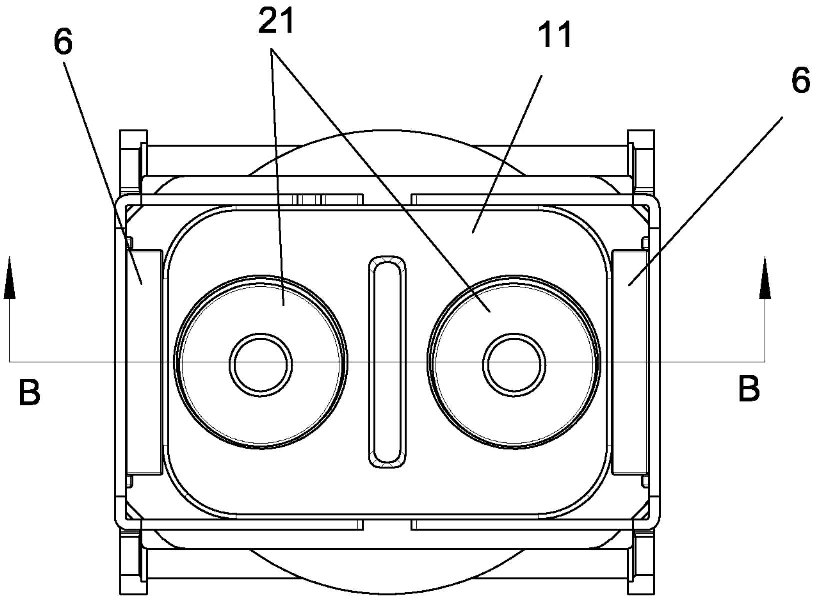
FIG. 7 is a top view of the relay provided by the embodiments of the present disclosure.

As shown in FIG. 6 to FIG. 8, the embodiment also provides a relay, including the magnetic shielding structure for the relay contact.

In the relay provided by this embodiment, the positions of the first magnetic shielding member 5, the permanent magnet 6 and the anti-short circuit assembly 3 are optimized and arranged, the first magnetic shielding member 5 can absorb the magnetic field from the permanent magnet 6 to the anti-short circuit assembly 3, i.e., the magnetic field generated by the permanent magnet 6 will be absorbed by the first magnetic shielding member 5 first, thus reducing the influence of the permanent magnet 6 on the anti-short circuit assembly 3, and thus improving the anti-short circuit effectiveness. In addition, the first magnetic shielding member 5 itself can not only be magnetized, but also absorb the magnetic field of the permanent magnet 6, so the suction force of the first magnetic shielding member 5 to the movable contact piece 22 will also increase when there is a short circuit current, thus further increasing the anti-short circuit effect.

In one embodiment, as shown in FIG. 6 to FIG. 8, the relay further includes a contact container 1, the first magnetic shielding member 5 of the magnetic shielding structure for the relay contact is disposed inside the contact container 1, the permanent magnet 6 is disposed outside the contact container 1, and the permanent magnet 6 is disposed between the yoke clamp 7 and the contact container 1.

The first magnetic shielding member 5 is disposed inside the contact container 1, that is, the first magnetic shielding member 5 is sleeved outside the part of the stationary contact lead-out terminal 21 located inside the contact container 1, and the first magnetic shielding member 5 and the permanent magnet 6 are respectively disposed inside and outside the contact container 1, so the contact container 1 also plays the role of isolating the permanent magnet 6 and the anti-short circuit assembly 3 to a certain extent.

In one embodiment, as shown in FIG. 6 to FIG. 8, the relay further includes a pushing assembly 4, which includes a pushing rod 411, a base 412, an elastic member 43 and a U-shaped bracket 42. The base 412 and the upper portion of the pushing rod 411 can be integrally injection molded to form the pushing rod unit 41, and the bottom of the U-shaped bracket 42 is fixedly connected with the base 412, and the U-shaped bracket 42 and the base 412 enclose a frame structure. The movable contact piece 22 and the elastic member 43 are installed in the frame structure surrounded by the U-shaped bracket 42 and the base 412. One end of the elastic member 43 abuts against the base 412, and the other end abuts against the movable contact piece 22. The elastic member 43 can provide elastic force, so that the movable contact piece 22 tends to be far away from the base 413 and close to the stationary contact lead-out terminals 21.

The relay further includes an electromagnet unit 44, which is disposed at the side of the yoke plate 13 facing away from the insulating cover 11 and surrounds the metal cover. The pushing rod unit 41 is drivingly connected with the electromagnet unit 44. The pushing rod unit 41 is movably arranged in the electromagnet unit 44 and is connected with the movable contact piece 22 through the via hole of the yoke plate 13. When the electromagnet unit 44 is energized, it can drive the pushing rod unit 41 to move, and then drive the movable contact piece 22 to move to contact with or separate from the stationary contact lead-out terminals 21.

The electromagnet unit 44 includes a bobbin 441, a coil 442, a stationary iron core 444 and a movable iron core 443. The bobbin 441 has a hollow cylindrical shape and is formed of an insulating material. The metal cover is configured to be inserted into the bobbin 441, and the coil 442 surrounds the bobbin 441. The stationary iron core 444 is fixedly disposed in the metal cover, and part of the stationary iron core 444 extends into the via hole of the yoke plate 13. The stationary core 444 has a first perforation, which is disposed corresponding to the position of the via hole of the yoke plate 13 for the pushing rod unit 41 to pass through. The movable iron core 443 is movably arranged in the metal cover and opposite to the stationary iron core 444, and the movable iron core 443 is connected with the pushing rod unit 41 for being attracted by the stationary iron core 444 when the coil 442 is energized. The movable iron core 443 and the pushing rod unit 41 can be connected by screwing, riveting, welding or other means.

The working process of the relay provided by the embodiment is as follows.

When the coil 442 is energized, the movable iron core 443 moves upward and drives the pushing rod unit 41 to move upward, and under the pushing action of the pushing rod unit 41, the movable contacts at both ends of the movable contact piece 22 come into contact with the two stationary contact lead-out terminals 21, respectively.

When the coil 442 is de-energized, the movable iron core 443 then moves the pushing rod unit 41 downwardly so that the movable contacts at the both ends of the movable contact piece 22 are separated from the two stationary contact lead-out terminals 21.

It should be noted here that the relay shown in the drawings and described in this specification is only one example of applying the principles of the present disclosure. It should be clearly understood by those skilled in the art that the principles of the present disclosure are not limited to any details or any components of the device shown in the drawings or described in the specification.

It should be understood that the present disclosure is not limited to the detailed structure and arrangement of components set forth in this specification. The present disclosure is capable of other embodiments and of being realized and carried out in various ways. The foregoing variations and modifications are within the scope of the present disclosure. It should be understood that the disclosure disclosed and defined in this specification extends to all alternative combinations of two or more individual features mentioned or obvious in the text and/or the drawings. All these different combinations constitute various alternative aspects of the present disclosure. The embodiments described in this specification illustrate the best modes known for carrying out the present disclosure and will enable those skilled in the art to make use of the present disclosure.

Other embodiments of the present disclosure will easily occur to those skilled in the art after considering the specification and practicing the creation disclosed herein. The present disclosure is intended to cover any variations, uses or adaptations of this disclosure, which follow the general principles of the present disclosure and include common sense or common technical means in this technical field that are not disclosed in the present disclosure. The specification and the exemplary embodiments are to be regarded as exemplary only, with the true scope and spirit of the disclosure being indicated by the appended claims.

It should be understood that the present disclosure is not limited to the precise structure described above and shown in the drawings, and various modifications and changes can be made without departing from its scope. The scope of protection of the present disclosure is limited only by the appended claims.

What is claimed is:

1. A magnetic shielding structure for a relay contact, comprising:

a contact assembly, comprising a movable contact piece and a pair of stationary contact lead-out terminals, the movable contact piece configured to contact with or separate from the pair of stationary contact lead-out terminals;

an anti-short circuit assembly, which is at least disposed at a side of the movable contact piece facing the stationary contact lead-out terminals, and is configured to generate suction force in the event of a faulty high current in the movable contact piece for resisting an electrodynamic repulsion force between the movable contact piece and the stationary contact lead-out terminals;

a permanent magnet, disposed around the contact assembly to achieve arc extinguishing by using a magnetic field formed by the permanent magnet; and a first magnetic shielding member, disposed at an outside of a stationary contact lead-out terminal for shielding a magnetic field generated by the stationary contact lead-out terminal when energized; wherein the first magnetic shielding member is configured to absorb the magnetic field transmitted from the permanent magnet to the anti-short circuit assembly, wherein there are two permanent magnets, and the two permanent magnets are respectively disposed on both sides of the movable contact piece along a length direction of the movable contact piece and are disposed in correspondence with two first magnetic shielding members; along the length direction of the movable contact piece, the two permanent magnets, the two first magnetic shielding members and the anti-short circuit assembly are disposed in an order of one of the two per magnets, one of the two first magnetic shielding members, the anti-short circuit assembly, another one of the two first magnetic shielding members and another one of the two permanent magnets, and a direction of a magnetic pole of each permanent magnet is arranged along the length direction of the movable contact piece.

2. The magnetic shielding structure for a relay contact according to claim 1, wherein the permanent magnet is disposed along a width direction of the movable contact piece.

3. The magnetic shielding structure for a relay contact according to claim 1, wherein an outer wall of the stationary contact lead-out terminal is provided with a limiting portion for limiting the first magnetic shielding member.

4. The magnetic shielding structure for a relay contact according to claim 1, wherein the stationary contact lead-out terminal is provided with a fixing portion on a side toward the movable contact piece, and the fixing portion is configured to be capable of being flipped in a direction away from the movable contact piece relative to the stationary contact lead-out terminal, and to abut against the first magnetic shielding member after being flipped for fixing the first magnetic shielding member.

5. The magnetic shielding structure for a relay contact according to claim 4, wherein the fixing portion is a flanging provided on the side of the stationary contact lead-out terminal facing the movable contact piece.

6. The magnetic shielding structure for a relay contact according to claim 1, wherein the stationary contact lead-out terminal and the first magnetic shielding member are fixed by welding, screwing or snapping.

7. The magnetic shielding structure for a relay contact according to claim 1, wherein the first magnetic shielding member is a closed ring structure annularly disposed around the stationary contact lead-out terminal; or, the first magnetic shielding member is distributed around the stationary contact lead-out terminal at intervals in a ring shape.

8. The magnetic shielding structure for a relay contact according to claim 1, wherein a magnetic permeability of the first magnetic shielding member is greater than a magnetic permeability of the stationary contact lead-out terminal.

9. The magnetic shielding structure for a relay contact according to claim 1, wherein a yoke clamp is provided outside the permanent magnet.

10. The magnetic shielding structure for a relay contact according to claim 1, the anti-short circuit assembly comprising:

an upper magnetizer, disposed at a side of the movable contact piece near the stationary contact lead-out terminals; and a lower magnetizer, disposed at a side of the movable contact piece far away from the stationary contact lead-out terminals;

wherein the upper magnetizer and the lower magnetizer are configured to form a magnetic circuit therebetween.

11. The magnetic shielding structure for a relay contact according to claim 10, wherein the movable contact piece is provided with a through hole, and the lower magnetizer is configured to at least partially penetrate through the through hole.

12. The magnetic shielding structure for a relay contact according to claim 11, wherein there are a plurality of upper magnetizers and a plurality of lower magnetizers, and the plurality of upper magnetizers and the plurality of lower magnetizers are disposed correspondingly, and side wall portions of two adjacent lower magnetizers which are close to each other are configured to pass through the through hole.

13. A relay, comprising a magnetic shielding structure for a relay contact, and the magnetic shielding structure comprising:

a contact assembly, comprising a movable contact piece and a pair of stationary contact lead-out terminals, the movable contact piece configured to contact or separate from the pair of stationary contact lead-out terminals;

an anti-short circuit assembly, which is at least disposed at a side of the movable contact piece facing the stationary contact lead-out terminals, and is configured to generate suction force in the event of a faulty high current in the movable contact piece for resisting an electrodynamic repulsion force between the movable contact piece and the stationary contact lead-out terminals;

a permanent magnet, disposed around the contact assembly to achieve arc extinguishing by using a magnetic field formed by the permanent magnet; and a first magnetic shielding member, disposed at an outside of a stationary contact lead-out terminal for shielding a magnetic field generated by the stationary contact lead-out terminal when energized; wherein the first magnetic shielding member is configured to absorb the magnetic field transmitted from the permanent magnet to the anti-short circuit assembly, wherein there are two permanent magnets, and the two permanent magnets are respectively disposed on both sides of the movable contact piece along a length direction of the movable contact piece and are disposed in correspondence with two first magnetic shielding members; along the length direction of the movable contact piece, the two permanent magnets, the two first magnetic shielding members and the anti-short circuit assembly are disposed in an order of one of the two per magnets, one of the two first magnetic shielding members, the anti-short circuit assembly, another one of the two first magnetic shielding members and another one of the two permanent magnets, and a direction of a magnetic pole of each permanent magnet is arranged along the length direction of the movable contact piece.

14. The relay according to claim 13, further comprising a contact container, wherein the stationary contact lead-out terminals are provided on the contact container and are configured to at least partially extend into the contact container, and the first magnetic shielding member of the magnetic shielding structure for the relay contact is disposed inside the contact container, the permanent magnet is disposed outside the contact container.

* * * * *